United States Patent [19]
Lee et al.

[11] Patent Number: 5,700,378
[45] Date of Patent: Dec. 23, 1997

[54] METHOD AND APPARATUS FOR GRAVITATIONAL SEPARATION OF FINE ARTICLES FROM A LIQUID

[75] Inventors: Hyosong Lee, Tumba; Lars Ehnström, Tullinge, both of Sweden

[73] Assignee: Vivex AB, Norsborg, Sweden

[21] Appl. No.: 617,601

[22] Filed: Mar. 19, 1996

[30] Foreign Application Priority Data

Mar. 20, 1995 [SE] Sweden .................. 9500966

[51] Int. Cl.$^6$ .................................. G01D 71/02
[52] U.S. Cl. ............... 210/771; 210/802; 210/521; 210/523; 210/534
[58] Field of Search ............... 210/802, 521, 210/522, 540, 533, 534, 523, 771

[56] References Cited

U.S. PATENT DOCUMENTS

| | | | |
|---|---|---|---|
| 1,248,374 | 11/1917 | Moore | 210/802 |
| 2,573,615 | 10/1951 | Senilles | 210/521 |
| 3,529,728 | 9/1970 | Middelbeek et al. | 210/540 |
| 3,903,000 | 9/1975 | Miura et al. | 210/522 |
| 4,045,344 | 8/1977 | Yokota | 210/521 |
| 4,202,778 | 5/1980 | Middelbeek | 210/522 |
| 4,514,303 | 4/1985 | Moore | 210/521 |
| 4,865,753 | 9/1989 | Meurer | 210/802 |
| 4,957,628 | 9/1990 | Schulz | 210/521 |

FOREIGN PATENT DOCUMENTS

| | | |
|---|---|---|
| 497295 | 8/1992 | European Pat. Off. . |
| 60-58214 | 4/1985 | Japan . |
| WO 92/09369 | 6/1992 | WIPO . |

Primary Examiner—Christopher Upton
Attorney, Agent, or Firm—Young & Thompson

[57] ABSTRACT

The invention relates to a method and an apparatus for the gravitational separation of fine particles out of a liquid. The liquid containing the particles which are to be separated is conducted with laminar flow through the gaps between a plurality of closely separated, essentially horizontally orientated surface-forming elements (16). The liquid flow through the gaps is interrupted when the particle concentration in the liquid which has flowed through the gaps exceeds a predetermined value. The surface-forming elements (16) are repositioned to an essentially vertical discharging position in order to remove the particle collection present on the surface-forming elements. The surface-forming elements (16) are then returned to the essentially horizontal working position and a new gravitational separation cycle begins.

32 Claims, 2 Drawing Sheets

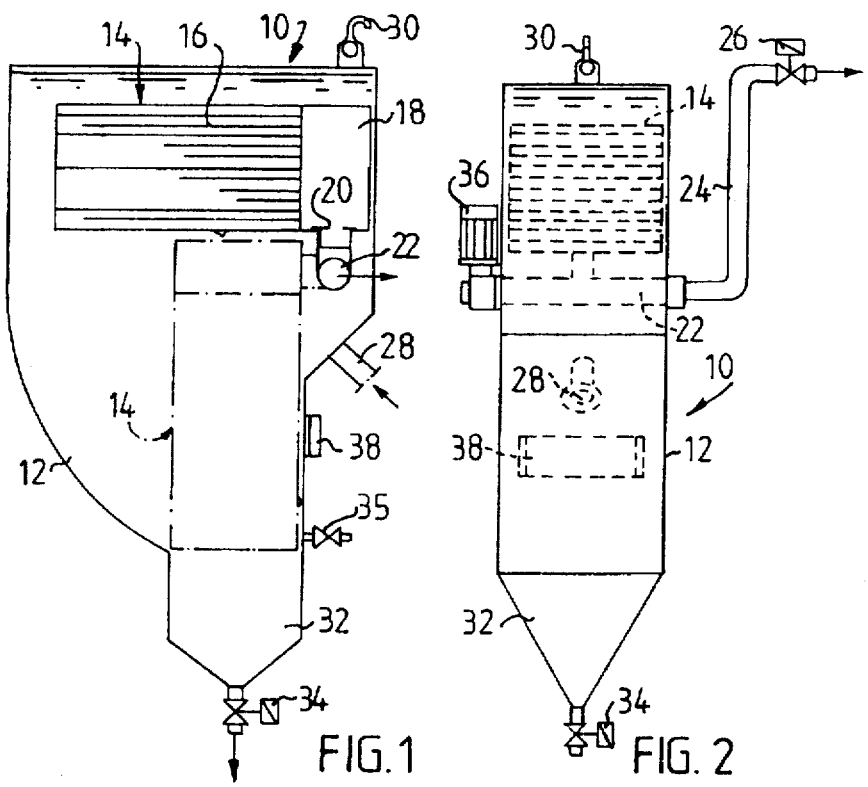
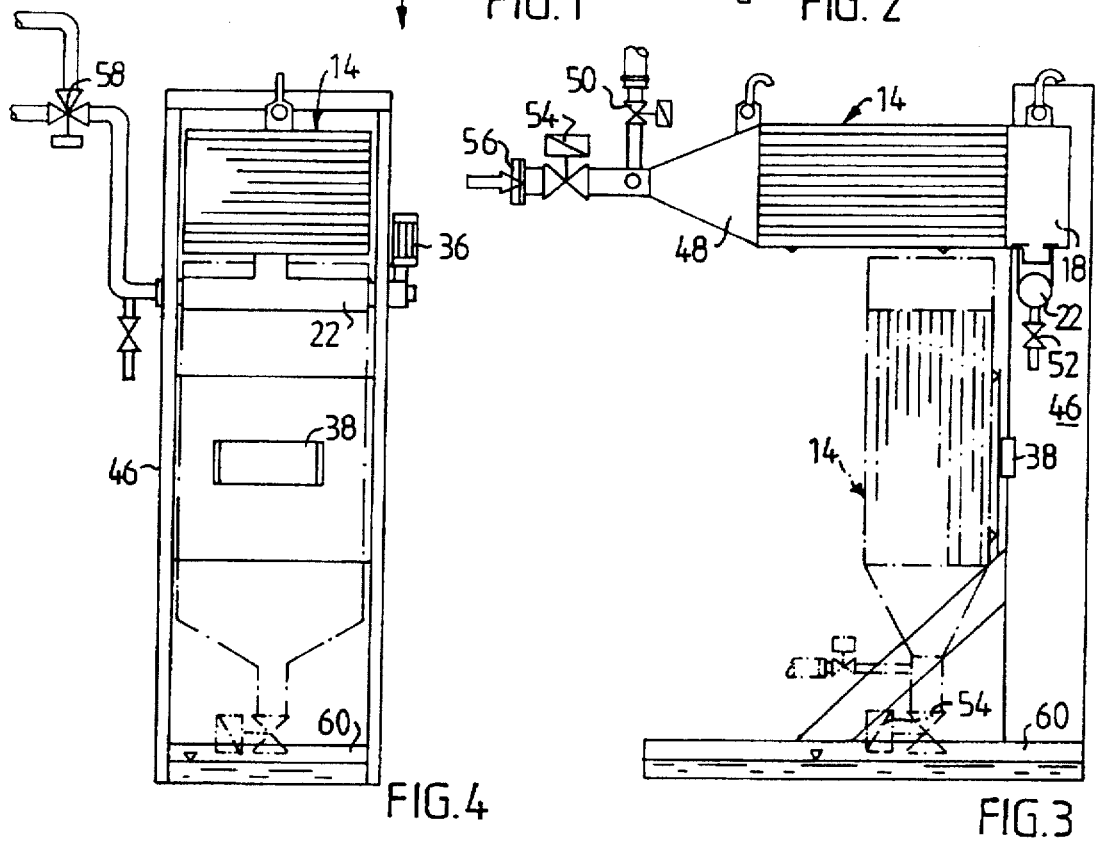

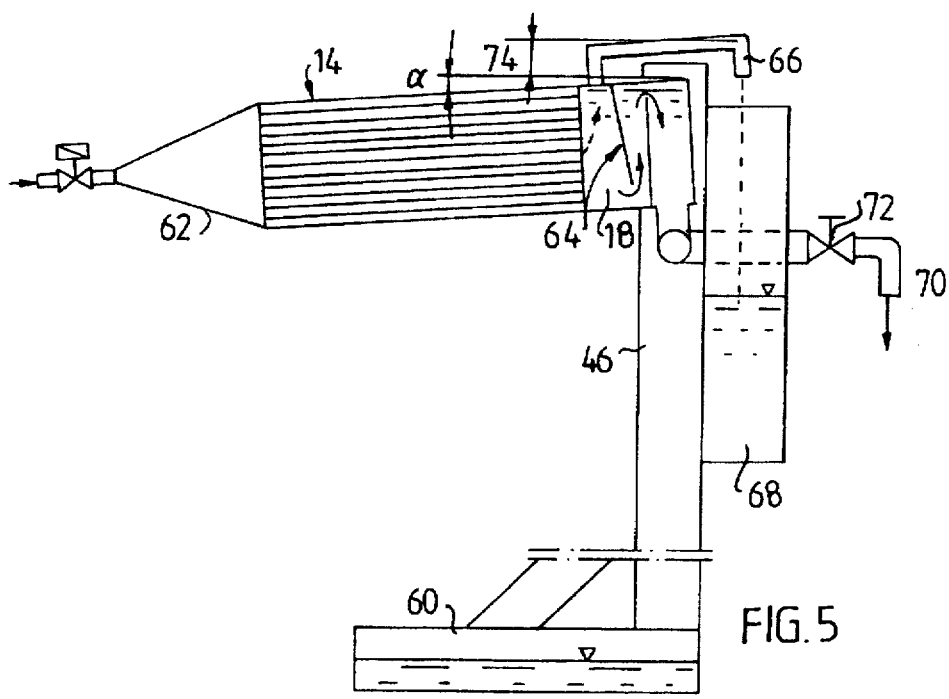
FIG. 5
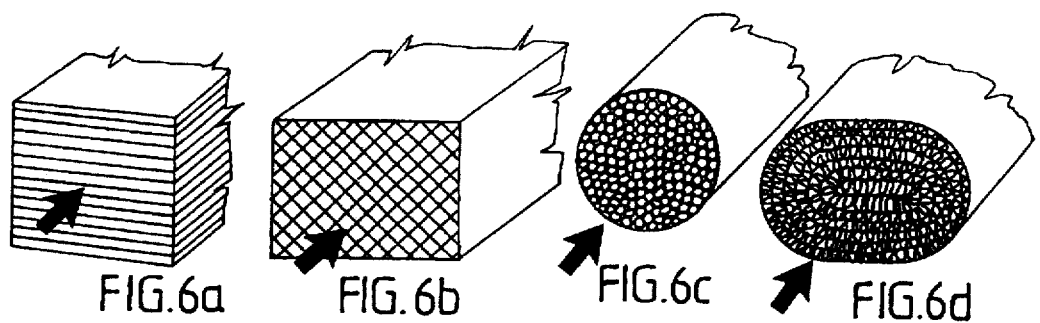
FIG. 6a  FIG. 6b  FIG. 6c  FIG. 6d
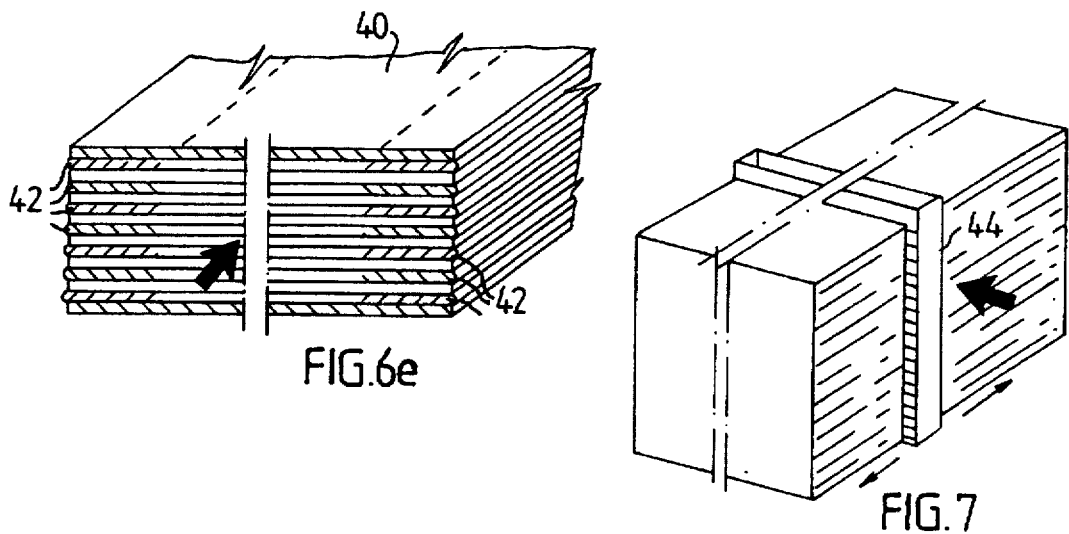
FIG. 6e
FIG. 7

METHOD AND APPARATUS FOR GRAVITATIONAL SEPARATION OF FINE ARTICLES FROM A LIQUID

The present invention concerns a method for gravitational separation of fine particles out of a liquid, especially for the separation of difficult-to-separate particles, the density of which being extremely close to that of a continuous liquid phase, which can be a mixture of two or more phases in a solid or liquid state.

In gravitational separation particles or liquid drops have a certain falling or flow velocity in a liquid, which depends on a number of factors, such as the difference in density between the particles and the continuous phase, the diameter of the particles and the viscosity of the continuous phase. The greater the density difference and the greater the particle diameter and the lower the viscosity of the continuous phase, then the bigger the fall or flow velocity becomes.

In order to allow a continuous gravity separation which is an improvement over conventional sedimentation tanks, it is possible to increase the surface area and reduce the liquid depths as much as possible through different arrangements. The most usual way is to provide a number of surface-forming elements, such as for example a plurality of plates with a small gap between them, often called a "lamella package or separator". A prerequisite for good separation is to ensure laminar flow, i.e. a flow which is as smooth as possible through the apparatus. In this way the particles have only to move a short distance before they reach a rigid surface and can be considered to be separated from the liquid phase. In order for the heavier or lighter phase to be continuously led out of the apparatus, these elements can be inclined. The distance between the surfaces varies depending on the media to be separated.

The most usual application for such lamella separators is as a thickener for different slurries, where the distance between the surfaces is relatively large, i.e. from one to several centimeters, and where the inclination angle of the surfaces can be up to about 50°, so that the slurry continually runs off them and clogging is prevented. The liquid can be supplied either concurrently or countercurrently in relation to the phases which have to be separated. During cleaning or clarification of difficult-to-separate liquid mixtures in lamella separators, it is desirable to have a distance between the wall surfaces which is as small as possible and a horizontally projected surface which is as large as possible.

Prior art lamella separators have, however, a limited separation capacity and are mostly used for easily separated slurries or the like. The effectiveness of horizontally projected lamella or plate surface is limited because the plates are inclined at approximately 50° so that the slurry shall be able to be discharged (fall down). Furthermore, the distance between the plates must be relatively large in order to prevent clogging because of the wall effects. Therefore, known separation methods and lamella separators are not suitable for difficult-to-separate fine particles, such as organic material like yeast, bacteria, algae, proteins, fibers or the like, which have a density which is very close to that of the liquid phase.

It has earlier been suggested to use different types of centrifugal separators in order to efficiently separate such particles. Such separators have, however, many obvious disadvantages, such as high investment costs, high operation costs, the risk of turbulent flow, the risk of clogging, etc.

The use of hydrocyclones separators has also been suggested, but these require a lot of energy, have a use limited to specific applications and are very dependent on constant process conditions, i.e. they have a low flexibility. Furthermore, they have a very bad or no capacity to separate two liquid phases. The extracted sediment has a low concentration, and dimensions of the cyclone vital for the separation can easily be changed through wear.

As an alternative to gravitational separation and the above centrifugal separating methods, it has also been suggested to use different filtering principles. These have, however, the following disadvantages:

- in general they cannot separate two liquids
- the filter media are often expensive to buy and to destroy
- the risk of clogging with consequential stoppages
- they require maintenance and qualified personnel
- in some cases the filter media causes environmental problems.

An object of the present invention is therefore to suggest a method by which difficult-to-separate particles, i.a. yeast, bacteria, algae, proteins, fibers etc can be separated efficiently with a less expensive apparatus having less energy consumption.

In order to achieve this, the following requirements must be met:

1. Small particles with a density near that of the continuous liquid phase should be able to be separated.
2. The separation must be reliable and should not cause stoppages, for example because of clogging, i.e. high availability must be achievable.
3. The separation should have a maximum settling area in the smallest possible machine volume, a short sedimentation distance and laminar flow.
4. The separated sediment should have a high dry substance content.
5. Environmentally damaging waste should not be produced.
6. The apparatus should have a low energy consumption.
7. The apparatus should be comprised in a closed system and be hygienic, i.e. not have any dead spaces and be able to be automatically cleaned without dismantling.

In order to achieve this, an embodiment of the present invention may include the steps of leading the liquid containing particles in a laminar flow through gaps between a plurality of closely separated, essentially horizontally oriented, surface-forming elements, interrupting the liquid flow through the gaps when the particle concentration in the liquid, the so-called effluent, which has passed through the gaps, exceeds a predetermined value, repositioning the surface-forming elements to an essentially vertical position for removal of particle accumulations on the surface-forming elements, and returning the surface-forming elements to the essentially horizontal working position after cleaning for the commencement of a new gravitational separation cycle. By leading the liquid mixture through gaps between a plurality of closely separated, essentially horizontally orientated surface-forming elements, a maximum sedimentation and collection surface inside the smallest possible machine volume is achieved, wherein the particles can be separated in a cross-current in a laminar liquid flow. The emptying of the particle sediment on the surface elements can take place with or without preceding drying.

In a further embodiment, the present invention is an apparatus for gravitational separation of fine particles out of a liquid which may include a separation unit with a plurality of closely separated, surface-forming elements, an inlet for the liquid to the separation unit and an outlet from the separation unit for the liquid from which particles have been separated in the separation unit. The separation unit may be movable between an essentially horizontal working position, in which the liquid is intended to flow through it for the separation of particles by sedimentation on the surface-forming elements, and an essentially vertical position in which the particles accumulated on the elements can be discharged from the separation unit.

The invention is described more closely below with reference to the enclosed drawings, in which:

FIG. 1 is a schematic side view of a first embodiment of a separation arrangement working on the gravitational principle according to the present invention;

FIG. 2 is an end vire of the separation arrangement of FIG. 1;

FIG. 3 is a schematic side view of a second embodiment of the separation arrangement according to the invention;

FIG. 4 is an end view of the arrangement in FIG. 3;

FIG. 5 shows a third embodiment of the separation arrangement according to the invention, in a side view;

FIGS. 6a–6e show different embodiments of collections of surface-forming elements which can be used in the different embodiments of the separation arrangement according to the invention; and FIG. 7 shows a schematic perspective view of an accessory movable in a cross-stream direction in a separation arrangement, for keeping the individual thin surface elements a desired distance apart, and permitting scraping thereof.

In FIG. 1 an arrangement working with gravitational separation according to a first embodiment of the invention is generally referenced with 10. The arrangement 10 comprises a separation unit 14 having a plurality of parallel, adjacent surface elements 16, enclosed in a closed feed tank 12. These elements 16 can suitably be made as channel-forming, tube-like elements such as shown in FIGS. 6b–6d, or made from flat, parallel lamellae or plates, as is shown in FIG. 6a, which, by means of suitable spacer means (not shown), can be held a small distance apart, approximately 1–3 mm, preferably approximately 1 mm, in order to form a lamella package or a cassette with a large collection surface and fine through-flow spaces. The spacer means of FIG. 6a can be made of free threads or strips of the same length as the plates and which are held in place by U-shaped holders at the end faces, whereby the plates and the spacers can be stacked upon each other and finally compressed by a cassette cover. An equalization chamber 18, with a throttling device 20 in its bottom in order to ensure an even liquid distribution in the cassette 14, is connected to the downstream end thereof.

The cassette 14 is pivotably mounted on a shaft 22 in the tank 12, between an essentially horizontal working position for separation of particles, as shown in FIG. 1 with solid lines, and an essentially vertical discharging position shown with dashed lines As shown in the figures, the shaft 22 has an axis which is transverse to the direction of liquid flow, so that cassette is tilted to an essentially vertical position about an axis transverse to the direction of liquid flow. The shaft 22 can be formed as a hollow shaft and forms together with a pipe 24 an outlet for the liquid, the so-called effluent, which has flowed through the cassette 14. The outlet can be closed by a valve 26. Alternatively, the hollow shaft can itself be formed so that it automatically closes the outlet when the cassette is tilted to its vertical emptying position.

The feed tank 12 has an inlet 28 for the liquid mixture to be separated in the separation arrangement according to the invention, and an air or gas outlet 30 in its upper part. In the lower part of the feed tank 12 there is a sediment chamber 32 with a closable bottom valve 34.

The separation cassette 14 is rotatable between its respective horizontal and vertical positions by means of a tipping means 36 (FIG. 2), whereby, when the cassette is vertical, the upstream end of cassette 14 is arranged to dock or align with an upper opening of the sediment chamber 32 to permit discharge of the sediment from the cassette 14 separate from the rest of the tank volume, and to thereby prevent diluting of the sediment. The feed tank 12 has an outlet 35 immediately above the upper opening on the sediment chamber 32 in order to permit draining of the tank 12 before the downward rotation of the cassette 14. This makes it possible to first dry the sediment collected on the plate surfaces with a drying gas in a similar fashion to that which will be described below in connection with an alternative embodiment shown in FIGS. 3 and 4. In order to promote emptying of the cassette 14 in its vertical position, a vibrator 38 is arranged to vibrate it so that the sediment is shaken away from the surface elements 16 and falls down into the sediment chamber 32.

The above described arrangement has the following working principle. The liquid mixture to be separated is introduced into the tank 12 via the inlet 28 and flows with a slow laminar flow through the small spaces defined by the surface elements 16 of the essentially horizontally orientated separation cassette 14. The liquid flow can be achieved by slowly pumping the liquid through inlet 28, or rather it can be drawn or sucked through the separation arrangement from the outlet side, whereby a smoother, vortex-free flow can be achieved in the tank 12. Gravity induced flow, controlled with the throttling device on the outlet side, is also possible. The liquid flow through the cassette 14 must naturally be adapted to the precipition velocity of the particles and can be calculated according to Stoke's law or determined experimentally. Due to the horizontal position of the cassette 14, a maximal collecting and separation surface is obtained in the unit. The particles in the liquid separate in this way across the stream and collect on the surface elements and form aggregates or another type of sediment depending on the actual application, as will be described in more detail below.

When the degree of separation shows a tendency to decline, i.e. when the particle concentration in the effluent increases, this means that the sedimentation capacity of the cassette 14 has been reached, at which point the flow is stopped. The outlet valve 26 is closed and the tipping means 36 is activated to tilt the cassette 14 to its essentially vertical emptying position. The vibrator 38 is activated in order to efficiently shake loose the sediment from the surface elements, so that it falls down into the chamber 32. The valve 26 and the bottom valve 34 are then opened in order to discharge the sediment from the tank 12 at the same time as the surface elements are back-flushed by the liquid in the tank. Alternatively, the tank 12 can first be emptied of liquid through draining via the outlet 35 and the collected sediment on the surface elements dried before the cassette 14 is tipped to the emptying position. During this emptying phase a continuous flow of liquid in other processes upstream of the tank 12 can be insured by means of a buffer (not shown) or accumulation tank connected to a pipe leading to the inlet 28. In order to achieve a continuous separation, several cassettes can work in parallel with each other, suitably beside one another and mounted on the same hollow shaft 22, whereby certain cassettes can work while the others are being emptied. Once the emptying has finished, the cassette 14 is rotated back up to its substantially horizontal working position by means of the tipping means 36, after which the outlet valve 26 is opened and the separation in the cassette 14 continues.

The surface elements 16 in the cassette 14, which are essential for the invention, can be shaped in many different ways within the scope of the invention. As well as being flat parallel plates as shown in FIG. 6a, where the plates can be made of thin metal plates or of a plastic material, such as polyethylene or polypropylene which has a density lower than that of the liquid to be separated, so that they are buoyant, the surface-forming elements can also be made of other gap- or channel-forming elements, such as shown in FIGS. 6b–e.

FIG. 6b shows a stable structure having a large wall effect, where each channel has an essentially square cross-section inclined at an orientation of 45° to the horizontal and which is suitable when the liquid mixture contains both a heavy and a light phase, e.g. oil. A similar embodiment is shown in FIG. 6c, where the channel-forming surface elements are made of thin-walled tubes or cannulae of metal or plastic. In this way the tube cassette can be equipped with grids or screens (not shown) at the ends in order to hold the tubes in place during emptying without affecting the liquid flow, while at the same time large particles can be prevented from blocking the surface elements during separation. FIG. 6d shows an embodiment where the channel surface elements comprise corrugated elements which form a corrugated board-like structure. Yet another conceivable embodiment is shown in FIG. 6e where the surface elements are formed of a foil 40 of metal or strong plastic. The foil 40 can be wrapped and tightened around braces 42 at the opposing side parts of the formed cassette unit, so that sediment-accumulating surfaces are formed of a continuous foil at a lower cost than if individual plates were used. The foil is preferably made of a plastic material having a density which is lower than that of the liquid phase so that it floats therein. To prevent the adjacent, closely separated plastic foil layers from being sucked together, the foil cassette element can be arranged with a transversely movable comb element 44 (see FIG. 7), which has strings or the like with a thickness corresponding to the gap between the foil layers, whereby these strings can be moved from one side to the other of the separation unit in order to open or force apart the foil layers and to maintain a constant gap distance while at the same time performing a scraping action across the surface.

FIGS. 3 and 4 show another embodiment of the separation device according to the invention, in which the separation unit, i.e. the cassette 14, essentially corresponds to the above described embodiment, but instead of being integrated in a feed tank, it is suspended in a free-standing support 46 and is rotatable between an essentially horizontal operating position, shown with solid lines, and an essentially vertical emptying position, shown with dashed lines, by means of the tipping means 36, in a similar manner to that described earlier. In this embodiment the separation unit 14 has a funnel-shaped inlet chamber 48 with a liquid inlet 50. The inlet chamber 48 forms a second fluid equalization chamber in the horizontal working position of the separation unit 14. In this embodiment the separation unit can advantageously be used for drying of the sediment which has been collected on the surface elements before emptying. For this purpose the liquid inlet 50 is closed so that the liquid supply is interrupted. The free liquid in cassette 14 is drained via a needle valve 52, which is subsequently closed. A bottom valve 54 in the inlet chamber 48 is opened and a drying gas, e.g. hot air, from a gas inlet 56 is led through the separation unit 14, so that the hot gas flows over the thin sediment layers and dries them, whereby the departing moist air leaves the cassette 14 via a three-way valve 58 (FIG. 4), which is adjusted so that the air passes a condenser (not shown) and a drying unit before it is again rewarmed and returned to the inlet 56. Gases other than air can also be used.

It is also possible to lead the drying gas in the opposite flow direction. When the drying is finished, the gas circulation is interrupted and the bottom valve 54 closed, following which the whole cassette 14 is rotated by means of the tipping means 36 about the shaft 22 to the essentially vertical emptying position, such as shown with dashed lines in FIG. 3. The bottom valve 54 is then opened again and the vibrator 38 activated to efficiently remove the sediment from the plate surfaces. In this working position, the liquid inlet chamber 48 becomes a sediment outlet chamber. The sediment can be collected in a suitable container 60. Once the emptying is completed, the cassette is returned to the horizontal working position for the start of a new separation and drying cycle.

FIG. 5 shows a further embodiment of a separation device according to the invention which is suitable for a three-phase separation, for example of a suspension containing a light and a heavy liquid phase as well as a solid phase in the form of fine particles. The liquid mixture is introduced into an inlet chamber 62 and the separation takes place in a cassette 14 in the same way as has been described in the previous embodiments. The equalization chamber 18 lying downstream from the cassette 14 has in this embodiment been complemented with an inclined intermediate wall 64 which forms a liquid lock. The lighter liquid phase is forced in this way to leave the cassette via a light phase outlet 66 and is collected in a light phase vessel 68. The heavy liquid phase passes through the liquid lock 64 and leaves the cassette via an outlet 70. A suitable pressure difference 74 can be achieved by means of a throttling valve 72, and in order to facilitate the transportation of the light phase to the equalization container 18, the cassette 14 can be held inclined at a small angle $\alpha$ relative to the horizontal. Sediment (slurry) settles on the surface elements and the cassette 14 can be emptied intermittently for collection of the sediment into the underlying container 60 in the same way as described earlier.

Tests have been performed on a pilot scale with the method according to the present invention and the result is shown in the examples 1 and 2 below.

EXAMPLE 1

A separation device according to FIGS. 1, 2 and 6a was used. A test separation of yeast cells (baker's yeast) took place in a cassette with 0.4 $m^2$ collecting area. The cassette contained 20 plates with the dimensions 10×20 cm. The material of the plates was 0.3 mm thick polyester and the gap between the plates was 1 mm. The yeast was mixed with water so that a suspension of 0.8% by volume of yeast was obtained. The yeast concentration was measured by test tube centrifuging. When the suspension was pumped through the cassette with a flow of 2.5 l/h, the effluent contained 0.02% by volume yeast. As the yeast cells have a sinking velocity of approximately 6 mm/h, this practical result corresponded relatively well with theory. After approximately 6 hours of separation, the yeast content in the effluent began to rise and the flow was stopped. The cassette was tipped and the yeast concentration obtained contained 4.8% by volume yeast.

EXAMPLE 2

Another test apparatus was mounted free-standing in accord-ance with FIGS. 3, 4 and 6a. This apparatus was larger and contained 77 plates of polystyrene with a thickness of 1 mm. The plates had the dimensions 370×250 mm and were equipped with three 10 mm wide, 250 mm long and 1 mm thick spacer elements, of which two were along the sides and one in the middle in order to insure a distance of 1 mm between the plates. The separation or collecting area was therefore 77×0.37×0.22=6.3 m². The free liquid volume in the lamella package was approximately 6 liters. In order to evaluate the separation efficiency a yeast suspension was used which contained 15 g of baker's yeast per liter of water, in other words 1.5% dry substance which corresponds to approximately 6% by volume. With the cassette in the horizontal position a flexible-hose pump pumped 26 l/h of the above suspension through the lamella package and the effluent was measured as having approximately 0.1% by volume remaining yeast. Because the free area in the cassette is approximately 165 cm², the flow speed with the above flow is approximately 2.5 cm/min, which means that the yeast is able to be separated onto the collecting surfaces. After approximately 2 hours the yeast content in the effluent began to rise, and the flow was therefore interrupted and the cassette drained of free liquid and tipped to the vertical position. The bottom valve was opened and the separated yeast concentration with a cream-like consistency was able to flow down into the container below. The yeast concentration was approximately 65% by volume which corresponds to approximately 16% dry weight. The plate surfaces were comparatively clean after approximately 2 minutes in the vertical position. It should be noted that the drying phase described above in connection with FIGS. 3 and 4 was not performed in the test according to Example 2.

The above examples show that this type of separator can be scaled up with good reliability.

The separator according to the invention is suitable for relatively hard-to-separate particles, such as yeast, bacteria, micro algae, fiber, starch and other proteins or depositions thereof. The apparatus can be suitably connected after for example screens, conventional lamella separators and decanting centrifuges for the fine separation ("polishing") of the outflowing liquid.

The arrangement can not only be used in waste and other cleaning processes but can also be comprised in in-line production processes, such as for example fermentation. In ethanol fermentation for example yeast is used in principle as a catalyst in order to change the fermentable carbohydrates to ethanol and carbonic acid. It is therefore desirable to re-use the yeast after completed fermentation and to replace a batch process with a continuous system. For this purpose centrifugal separators for the separation of the yeast have been used earlier, amongst others, and trials have also been made to immobilize the yeast in the fermentation tank. The latter have, however, failed because of clogging.

The present invention can solve this problem by the separation cassette being mounted directly in the fermentation tank just under the liquid surface. Yeast-free liquid can be sucked out of the fermentation tank via the cassette and pumped to a distillation column, and the yeast can continue to work. The cassette should be inclined somewhat to prevent carbondioxide or air from entering it and it can be tipped at certain intervals to remove the yeast. Because the apparatus lies under the liquid surface, the risk of infection is small.

In a similar manner, the apparatus can be used for the manufacture of beer, wine and other fermentation products. It is also desirable in aerobic and inaerobic waste fermentation to retain the microorganisms in the fermentation apparatus, and a "floating" emptiable cassette is also of interest.

We claim:

1. A method for the gravitational separation of fine particles from a liquid, comprising the steps of conducting the liquid containing the particles in a unidirectional laminar flow through spaces defined by a plurality of adjacent, essentially horizontally oriented, channel-forming elements in a box-shaped separation unit, interrupting the liquid flow through the spaces when the particle concentration in the liquid, which has passed through the spaces, exceeds a predetermined value, tilting the channel-forming elements to an essentially vertical position about an axis transverse to the direction of the liquid flow for removal of the particles on the channel-forming elements, and returning the channel-forming elements to essentially horizontal working position after cleaning for the commencement of a new gravitational separation cycle.

2. A method according to claim 1, comprising the steps of draining off the remaining free liquid in the spaces after the liquid flow through the spaces has been interrupted, and conducting a drying gas through the spaces in order to dry the particles collected on the elements, before these are repositioned to the essentially vertical position in order to remove the particles form the elements.

3. The method according to claim 2, wherein the drying gas used is dry warm air.

4. The method as according to claim 1, further comprising the steps of subjecting the channel-forming elements to vibrations in the essentially vertical position in order to facilitate and speed up the removal of the particle sediment from the elements.

5. The method according to claim 1, wherein the fluid contains a light phase as well as fine particles, and further comprising the steps of separating the light phase from the liquid downstream of the spaces defined by the channel-forming elements.

6. The method according to claim 5, further comprising the step of holding the channel-forming elements inclined slightly upwards relative to the horizontal in the direction of flow, in order to facilitate the separation of the light phase.

7. An arrangement for the gravitational separation of fine particles out of a liquid, comprising a separation unit with a plurality of adjacent channel-forming elements therein, an inlet for the liquid to the separation unit and an outlet from the separation unit for the liquid from which the particles have been separated in the separation unit, the separation unit being pivotable about an axis transverse to the direction of the liquid flow between an essentially horizontal working position, in which the liquid is intended to flow through it for the separation of particles by sedimentation on the channel-forming elements, and an essentially vertical position, in which the particles accumulated on the elements can be discharged from the separation unit.

8. The arrangement according to claim 7, wherein said separation unit is box-shaped.

9. The arrangement according to claim 7, wherein a first equalization chamber is immediately downstream of the outlet of the separation unit in order to promote the distribution of the liquid flow therethrough.

10. The arrangement according to claim 9, wherein the outlet of the equalization chamber is equipped with a throttling device.

11. The arrangement according to claim 9, for additional separation of a lighter liquid phase from the liquid, wherein the first equalization chamber has an upper outlet, for the lighter phase liquid, the channel-forming elements being inclined slightly upwardly in the direction of flow.

12. The arrangement according to claim 11, further comprising a liquid-trap with an inclined wall in the first equalization chamber in order to facilitate the separation of the light phase liquid.

13. The arrangement according to claim 7, wherein the separation unit is tiltably mounted between the essentially horizontal position and the essentially vertical position in a surrounding liquid feed tank.

14. The arrangement according to claim 13, wherein the feed tank has a sediment chamber with an upper opening, with which the inlet of the separation unit can dock in the essentially vertical discharging position of the separation unit.

15. The arrangement according to claim 14, wherein a draining outlet is provided in the tank at a level in the vicinity of said upper opening of the sediment chamber.

16. The arrangement according to claim 12, wherein the sediment chamber has a closable lower sediment outlet opening.

17. The arrangement according to claim 7, wherein a second equalization chamber is immediately upstream of said inlet of the separation unit in order to promote the distribution of the liquid flow therethrough.

18. The arrangement according to claim 17, wherein a closable inlet valve for the liquid which is to flow through the separation unit is associated with the second equalization chamber.

19. The arrangement according to claim 17, wherein the separation unit is supported in a free-standing support.

20. The arrangement according to claim 19, wherein the second equalization chamber has a closable opening, which forms a sediment outlet opening in the essentially vertical position of the separation unit.

21. The arrangement according to claim 20, further comprising a drying gas feed pipe connected to said closable opening for providing a drying gas when the separation unit is in the essentially horizontal position.

22. The arrangement according to claim 7, wherein the separation unit is rotatably mounted about a shaft in the region of the downstream end of the separation unit.

23. The arrangement according to claim 22, wherein the shaft is formed as a hollow shaft for discharging the outflowing liquid from the separation unit.

24. The arrangement according to claim 7, further comprising a vibrator for subjecting the channel-forming elements to vibrations in order to promote efficient discharge of the particle sediment collected upon them, in the essentially vertical position of the separation unit.

25. The arrangement according to claim 7, wherein several said separation units are rotatably mounted on a common shaft.

26. The arrangement according to claim 7, wherein the channel-forming elements comprise a plurality of adjacent, parallel thin-walled elements.

27. The arrangement according to claim 26, wherein the channel-forming elements have an essentially round cross-section.

28. The arrangement according to claim 26, wherein the channel-forming elements have an essentially square cross-section.

29. The arrangement according to claim 26, wherein the channel-forming elements have wave-shaped wall elements.

30. The arrangement according to claim 7, wherein the channel-forming elements have a density which is lower than that of the liquid which is to flow through the separation unit.

31. A method of gravitational separation of particles from a liquid comprising the steps of:

conducting the liquid containing the particles through spaces defined by a plurality of adjacent, essentially horizontal surface elements;

interrupting the flow of the liquid through the spaces;

draining the liquid from the spaces;

conducting a drying gas through the spaces to dry the particles collected on the surface elements;

tilting the surface elements to an essentially vertical position for removal of the dried particles from the surface elements; and repositioning the surface elements to an essentially horizontal position.

32. A device for gravitational separation of particles from a liquid comprising:

a separation unit for conducting the liquid therethrough;

a plurality of surface elements in said separation unit for separating the particles from the liquid, said surface elements being pivotable between an essentially horizontal position and an essentially vertical position; and a hollow shaft for discharging the liquid from the separation unit and about which said surface elements are pivotable.

* * * * *

UNITED STATES PATENT AND TRADEMARK OFFICE
CERTIFICATE OF CORRECTION

PATENT NO. : 5,700,378
DATED : December 23, 1997
INVENTOR(S) : Hyosong LEE et al.

It is certified that error appears in the above-indentified patent and that said Letters Patent is hereby corrected as shown below:

On title page, item [54] and col. 1, line 3, change "articles" to --particles--.

Signed and Sealed this

Twenty-fourth Day of February, 1998

Attest:

BRUCE LEHMAN

*Attesting Officer*  *Commissioner of Patents and Trademarks*